(12) United States Patent
Ishikawa et al.

(10) Patent No.: US 8,423,985 B2
(45) Date of Patent: Apr. 16, 2013

(54) SYSTEM, METHOD AND COMPUTER PROGRAM FOR GENERATING SEQUENCE DIAGRAM

(75) Inventors: Hiroshi Ishikawa, Yamato (JP); Hiroaki Nakamura, Yamato (JP); Kouichi Ono, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 12/478,815

(22) Filed: Jun. 5, 2009

(65) Prior Publication Data

US 2009/0307654 A1 Dec. 10, 2009

(30) Foreign Application Priority Data

Jun. 6, 2008 (JP) ................................. 2008-149498

(51) Int. Cl.
*G06F 9/45* (2006.01)
(52) U.S. Cl.
USPC .......................................... 717/154; 717/156
(58) Field of Classification Search ........... 717/154–157
See application file for complete search history.

(56) References Cited

FOREIGN PATENT DOCUMENTS

| | | |
|---|---|---|
| JP | 2004-094496 | 3/2004 |
| JP | 2005-092609 | 4/2005 |

OTHER PUBLICATIONS

Briand, L., et al., Toward the Reverse Engineering of UML Sequence Diagrams for Distributed Java Software, IEEE, 2006, 22 pgs.*
Delamare, R., et al., Reverse-engineering of UML 2.0 Sequence Diagrams from Execution Traces, CiteSeerX, 2006, 5 pgs.*
Tonella, P. and Potrich, A., Reverse Engineering of the Interaction Diagrams from C++ Code, IEEE, 2003, 10 pgs.*
Stroulia, E. and Systa, T., Dynamic Analysis for Reverse Engineering and Program Understanding, ACM, 2002, 10 pgs.*

* cited by examiner

*Primary Examiner* — Anna Deng
(74) *Attorney, Agent, or Firm* — Vazken Alexanian

(57) ABSTRACT

A system, method and computer program for generating a sequence diagram that specifies processing among modules included in source code. First, a source code is acquired and then analyzed to generate a log acquisition code for acquiring an execution log. Then, a program including the generated log acquisition code is executed to acquire execution log information on the execution of the program. On the basis of the acquired execution log information, automaton information on states and transitions among the states is extracted, and then the extracted automaton information is converted into sequence diagram component information on components constituting a sequence diagram. Thereafter, a sequence diagram is generated based on the converted sequence diagram component information.

9 Claims, 17 Drawing Sheets

| MODULE | FUNCTION |
|---|---|
| m0 | f0, f4 |
| m1 | f1, f5 |
| m2 | f2, f3, f6 |
| NO CORRESPONDING MODULE | f7 |

FIG. 2 loop(strict(<m0, f1, m1>, alt(<m1, f6, m2>, strict(<m1, f2, m2>, <m2, f0, m0>))))

```
loop(
    strict(<m0, f1, m1>,
        alt(
            strict(<m1, f6, m2>, <m2, f6:return, m1>),
            strict(<m1, f2, m2>, <m2, f0, m0>,  <m0, f0:return, m2>), <m2, f2:return, m1>))
        <m1, f1:return, m0>
)
```

SYSTEM, METHOD AND COMPUTER PROGRAM FOR GENERATING SEQUENCE DIAGRAM

CROSS-REFERENCE TO RELATED APPLICATIONS

This application claims priority under 35 U.S.C. §119 from Japanese Patent Application No. 2008-149498 filed Jun. 6, 2008, the entire contents of which are incorporated herein by reference.

BACKGROUND OF THE INVENTION

The present invention relates to a system, a method and a computer program which are capable of generating a sequence diagram with modeling objects narrowed down for a specific use case or interest, even in the case of a large-scale source code.

In recent years, development of system structures has been increasingly complicated due to enlargement in system scale, increase in the number of functions, and the like. Accordingly, various system development schemes are proposed to improve the productivity and quality of such large-scale systems. For instance, in model-driven development, the productivity of a program is improved by describing, as models, products in analysis steps, design steps and the like, while the quality of the program is improved by reducing the occurrence possibility of a bug and the like.

In the model-driven development, the productivity and quality can be improved if an appropriate model is described. However, the modeling itself is difficult. It is particularly difficult to model behaviors of a system, and this is one of disincentives to efficient system development.

To solve such a problem, Japanese Patent Application Publication No. 2004-094496 discloses, for instance, a sequence diagram generation system that traces calls and returns for each function included in a source code and then generates a sequence diagram showing the calls and returns among functional blocks. Specifically, the sequence diagram is generated on the basis of the trace result which includes information on the functional blocks related to the functions. Hence, this system is capable of identifying process flows among functionalities from their source code, thereby achieving accurate modeling.

Meanwhile, Japanese Patent Application Publication No. 2005-092609 discloses a sequence diagram display system which first generates structured information of a program, and then generates and displays a sequence diagram based on the structured information. To be more specific, the structured information indicates a structure in which objects included in a program are associated with each other in chronological order, and is generated on the basis of log information included in the log file generated when the program is executed. Since the system generates the sequence diagram in accordance with log information, it is possible to generate a sequence diagram corresponding to the executed program.

However, since the sequence diagram generation system of JP-A 2004-094496 generates a sequence diagram based on a source code, an analysis result of the source code becomes complicated when the system is large in scale, and the modeling objects cannot be narrowed down according to a use case, object of interest or the like. In addition, the system performs modeling on the entire source code even including unnecessary codes, which are included as a result of differential development. Accordingly, a problem arises that the generated sequence diagram is so complicated that the system analysis is difficult.

Meanwhile, the sequence diagram display system of JP-A 2005-092609 is incapable of extracting structures such as loops, branching and the like. For this reason, when there is immense log information, a huge and complicated sequence diagram is generated, leading to a problem of difficulty in analyzing the system.

SUMMARY OF THE INVENTION

The present invention provides a system, a method and a computer program which are capable of generating a sequence diagram by modeling only necessary portions of a source code while detecting a loop, branching or the like, even in the case of a large-scale source code.

Accordingly, a first aspect provides a sequence diagram generation computer system for analyzing a source code and generating a sequence diagram that specifies processing among modules included in the source code. The sequence diagram generation computer system includes: code acquisition means for acquiring the source code; analysis means for analyzing the acquired source code to produce an analysis result; log acquisition code generation means for generating, on the basis of the analysis result, a log acquisition code; execution log information acquisition means for acquiring, by executing a program including the generated log acquisition code, execution log information that is log information of the execution of the program; automaton information extraction means for extracting, on the basis of the acquired execution log information, automaton information related to states and transitions among the states; conversion means for converting the extracted automaton information into sequence diagram component information on components constituting a sequence diagram; and generation means for generating, on the basis of the converted sequence diagram component information, a sequence diagram.

A second aspect provides a sequence diagram generation method executable by a sequence diagram generation computer system for analyzing a source code and generating a sequence diagram that specifies processing among modules included in the source code. The method includes the steps of: acquiring, by the computer system, the source code to be analyzed; analyzing, by the computer system, the acquired source code to produce an analysis result; generating, by the computer system, a log acquisition code for acquiring an execution log on the basis of the analysis result; acquiring, by the computer system, an execution log information of a program execution by executing the program which includes the generated log acquisition code; extracting, by the computer system, an automaton information related to states and transitions among the states on the basis of the acquired execution log information; converting, by the computer system, the extracted automaton information into a sequence diagram component information on components constituting a sequence diagram; and generating, by the computer system, a sequence diagram on the basis of the converted sequence diagram component information.

A third aspect provides a computer program product executable by a sequence diagram generation computer system for analyzing a source code and generating a sequence diagram that specifies processing among modules included in the source code, the computer program product causing the sequence diagram generation computer system to execute the steps of the above method.

BRIEF DESCRIPTION OF THE DRAWINGS

For a more complete understanding of the present invention and the advantage thereof, reference is now made to the following description taken in conjunction with the accompanying drawings.

FIG. 2 is a diagram of a data structure of a sorted information storage device of the sequence diagram generation system of the first embodiment of the present invention.

FIGS. 16A to 16E are diagrams of a normalization process for converting automaton information into sequence diagram component information, carried out by the sequence diagram generation system of the second embodiment of the present invention.

FIGS. 20A and 20B are diagrams of a sequence diagram in which multiple modules are integrated.

DETAILED DESCRIPTION OF THE PREFERRED EMBODIMENTS

Figure 1:
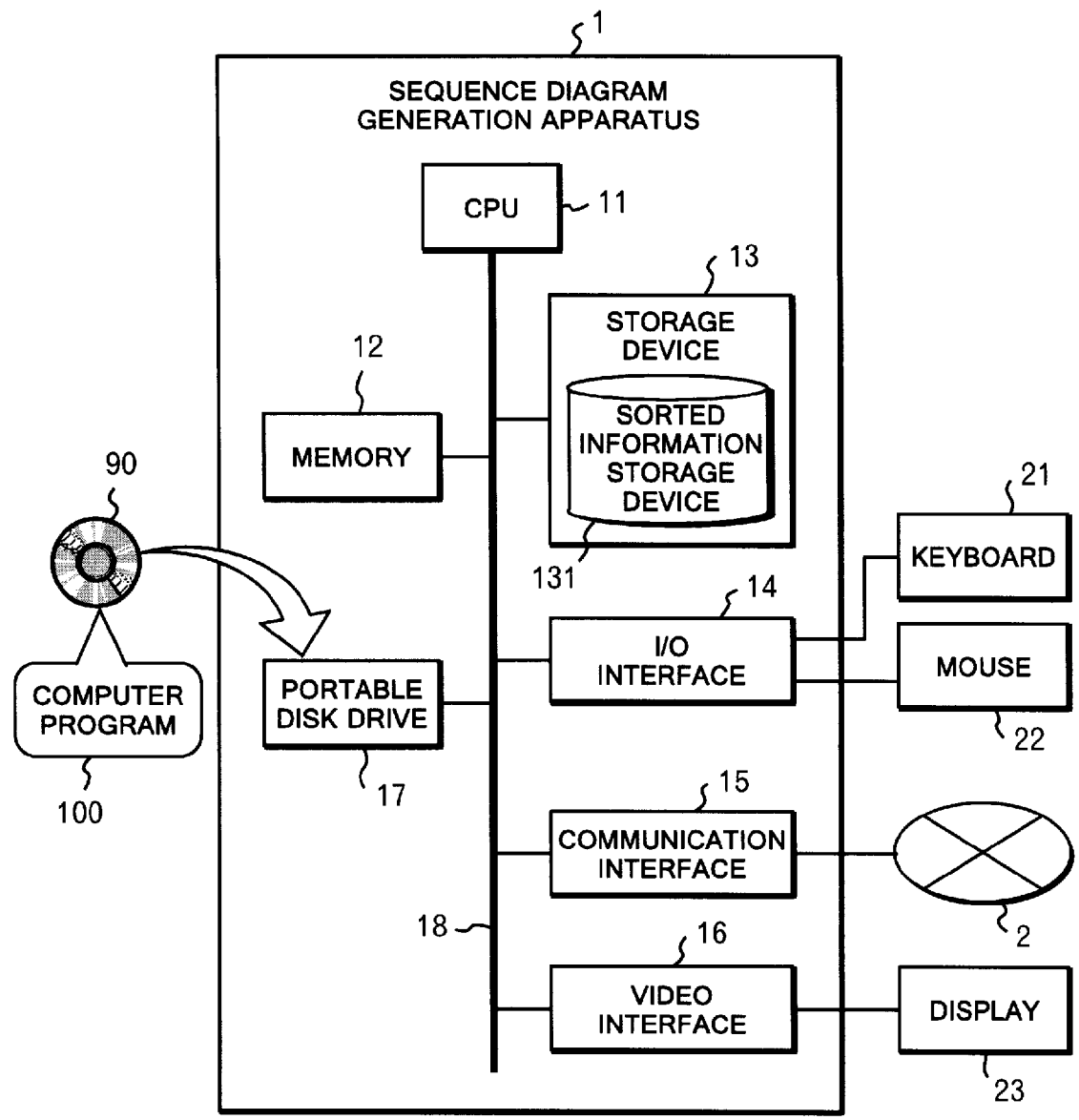
FIG. 1 is a block diagram illustrating a configuration example of a sequence diagram generation system of a first embodiment of the present invention.

A detailed description of the embodiments of the present invention with reference to the drawings follow. The same symbols are assigned to the same elements throughout the embodiments.

In a first embodiment of the present invention, a source code is analyzed to generate a sequence diagram that specifies processing among modules included in the source code. Here, a source code is acquired and the acquired source code is analyzed. Then, based on the analysis result, a log acquisition code for acquiring an execution log is generated, and a program including the generated log acquisition code is executed to acquire execution log information. Execution log information is log information on the execution of the program. Based on the acquired execution log information, automaton information on states and transitions among the states is extracted, the extracted automaton information is converted into sequence diagram component information on components constituting a sequence diagram, and a sequence diagram is generated by use of the converted sequence diagram component information.

Since the analysis is made based on the source code, modeling does not need to be considered. Thus, a sequence diagram of a minimum required structure can be generated easily by acquiring, on the basis of the execution log information, execution logs only for portions that need to be displayed as a sequence diagram. For this reason, a sequence diagram of a simple structure can be generated even in the case of a large-scale and complicatedly structured source code, and system analysis based on the sequence diagram clarifies problems with a system such as the locating of a bottleneck occurrence.

More specifically, in the first embodiment of the present invention, correspondence information on respective correspondences between calling functions and called functions are acquired on the basis of the source code, and sorted information including the calling functions and called functions sorted on a module basis is acquired. From among the acquired correspondence information, only the correspondence information is extracted in which a calling function and a called function different from each other are included and the different calling and called functions are sorted into different modules, respectively. Then, a log acquisition code is generated so that an execution log can be outputted when the called function is called by the calling function included in the extracted correspondence information.

Accordingly, respective correspondences between the calling functions and the called functions can be specified for each module, whereby acquisition of process transition logs among modules can be assured. Thereafter, a sequence diagram of a minimum required structure can be generated easily by acquiring execution logs only for portions that need to be displayed as a sequence diagram, without considering a modeling process.

In a second embodiment of the present invention, correspondence information on respective correspondences between calling functions and called functions are acquired on the basis of the source code, and sorted information including the calling functions and called functions are sorted on a module basis is acquired. From among the acquired correspondence information, only the correspondence information is extracted in which a calling function and a called function different from each other are included and the different calling and called functions are sorted into different modules, respectively. Then, a log acquisition code is generated so that an execution log can be outputted when the called function is called by the calling function included in the extracted correspondence information, as well as when the processing returns to the calling function.

Accordingly, respective correspondences between the calling functions and the called functions can be specified for each module, and return execution timings of the calling functions can be specified. This assures acquisition of process transition logs among modules, as well as of timings of execution of certain functions. Thereafter, a sequence diagram including execution occurrences of modules can be generated easily by more accurately acquiring execution logs only for portions that need to be displayed as a sequence diagram, without considering a modeling process.

Note that in the following embodiments, code acquisition means corresponds to processes of the CPU 11 in steps S401 and S1201, analysis means corresponds to processes of the CPU 11 in steps S404 to S409 and steps S1204 to S1209, log acquisition code generation means corresponds to processes of the CPU 11 in steps S410 and S1210, execution log information acquisition means corresponds to processes of the CPU 11 in steps S411 and S1211, automaton information extraction means corresponds to processes of the CPU 11 in steps S412 and S1212, conversion means corresponds to processes of the CPU 11 in steps S413 and S1213, and generation means corresponds to processes of the CPU 11 in steps S414 and S1214. In addition, sorted information acquisition means corresponds to processes of the CPU 11 in steps S403 and S1203, and extraction means corresponds to processes of the CPU 11 in steps S407 and S1207.

A first embodiment is described with reference to the drawings pertaining to the first embodiment.

FIG. 1 is a block diagram illustrating a configuration example of a sequence diagram generation system of a first embodiment of the present invention. A sequence diagram generation system 1 of the first embodiment is composed of at least a CPU (central processing unit) 11, a memory 12, a storage device 13, an I/O interface 14, a communication interface 15, a video interface 16, a portable disk drive 17 and an internal bus 18 connecting the above-mentioned hardware.

The CPU 11 is connected to the above-mentioned hardware components of the sequence diagram generation system 1 through an internal bus 18, and controls operations of the above-mentioned hardware components. The CPU 11 also executes various software functions according to a computer program 100 stored in the storage device 13. The memory 12 includes a volatile memory such as an SRAM and an SDRAM. A load module is executed at the time of executing the computer program 100, and the memory 12 stores temporary data or the like generated when the computer program 100 is executed.

The storage device 13 is composed of a fixed storage device (hard disk) incorporated in the computer, a ROM and the like. The computer program 100 stored in the storage device 13 is downloaded by the portable disk drive 17 from a portable recording medium 90 such as a DVD and a CD-ROM in which information such as a program and data are recorded, and is loaded to the memory 12 from the storage device 13 to be executed. The program may otherwise be a computer program downloaded from an external computer connected to a network 2 through a communication interface 15.

Moreover, the storage device 13 stores source code information of a program to be executed, for example, in the form of text data. The storage device further includes a sorted information storage device 131 for storing sorted information in which functions (calling functions and called functions) included in a source code are sorted for each predetermined module unit.

The communication interface 15 is connected to the internal bus 18, and is capable of exchanging data with an external computer, or the like, through its connection to the external network 2 such as the Internet, a LAN, or a WAN.

The I/O interface 14 is connected to data entry media such as a keyboard 21 and a mouse 22, and receives input of data. The video interface 16 is connected to a display 23 such as a CRT monitor or an LCD, and displays certain images.

FIG. 2 is an exemplary diagram of a data structure of the sorted information storage device 131 in the sequence diagram generation system 1 of the first embodiment of the present invention. As shown in FIG. 2, the sorted information storage device 131 stores a module name which may also be a unit of execution, and a group of functions associated with each module name. Here, "no corresponding module" is an item indicating functions which should be excluded from the sequence diagram generation targets.

Figure 3:
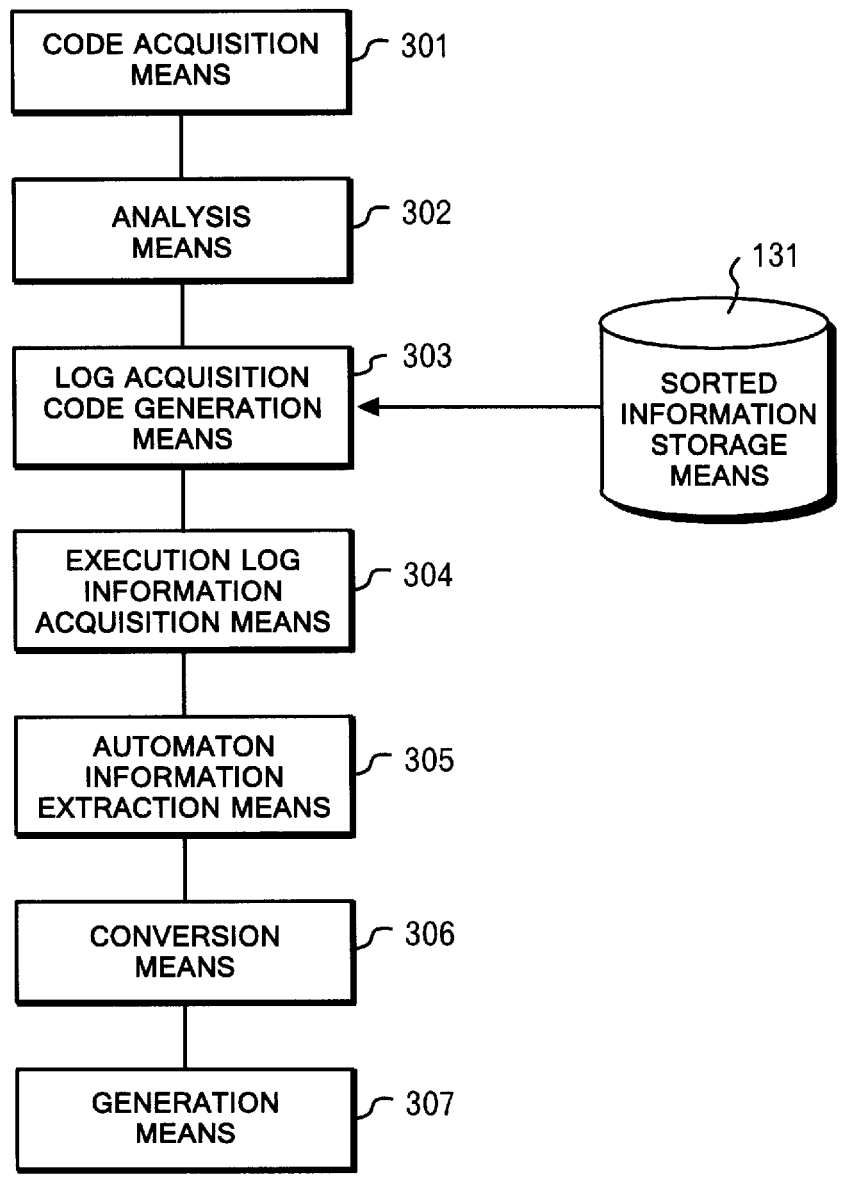
FIG. 3 is a functional block diagram of the sequence diagram generation system of the first embodiment of the present invention.

FIG. 3 is a functional block diagram of the sequence diagram generation system 1 of the first embodiment of the present invention. Code acquisition means 301 acquires a source code of a computer program stored in the storage device 13 including a portion which is a target of sequence diagram generation. Specifically, the code acquisition means 301 reads the source code from the storage device 13 and loads it to the memory 12. Analysis means 302 performs an analysis statically on the obtained source code. To be specific, the analysis means 302 acquires, based on the source code, correspondence information on respective correspondence relationships between calling functions (functions on the calling side) and called functions (functions on the called side) included in the source code.

Log acquisition code generation means 303 generates a log acquisition code for acquiring an execution log based on the analysis result of the analysis means 302. To be specific, the log acquisition code generation means 303 reads sorted information stored in the sorted information storage device 131 and extracts only pieces of correspondence information in which a calling function is different from a called function and the calling and called functions are sorted into different modules, respectively. Then, the log acquisition code generation means 303 generates a log acquisition code so that an execution log can be outputted when the called function is called by the calling function included in the extracted piece of correspondence information.

Execution log information acquisition means 304 generates an execution module, for example, by compiling programs including the generated log acquisition codes, and then acquires execution log information that can be acquired when the execution module is executed.

Automaton information extraction means 305 extracts, based on the acquired execution log information, automaton information related to states and transitions among the states. Then, the conversion means 306 converts the extracted automaton information into sequence diagram component information that constitutes a sequence diagram. Generation means 307 generates a sequence diagram based on the converted sequence diagram component information.

Figure 4:
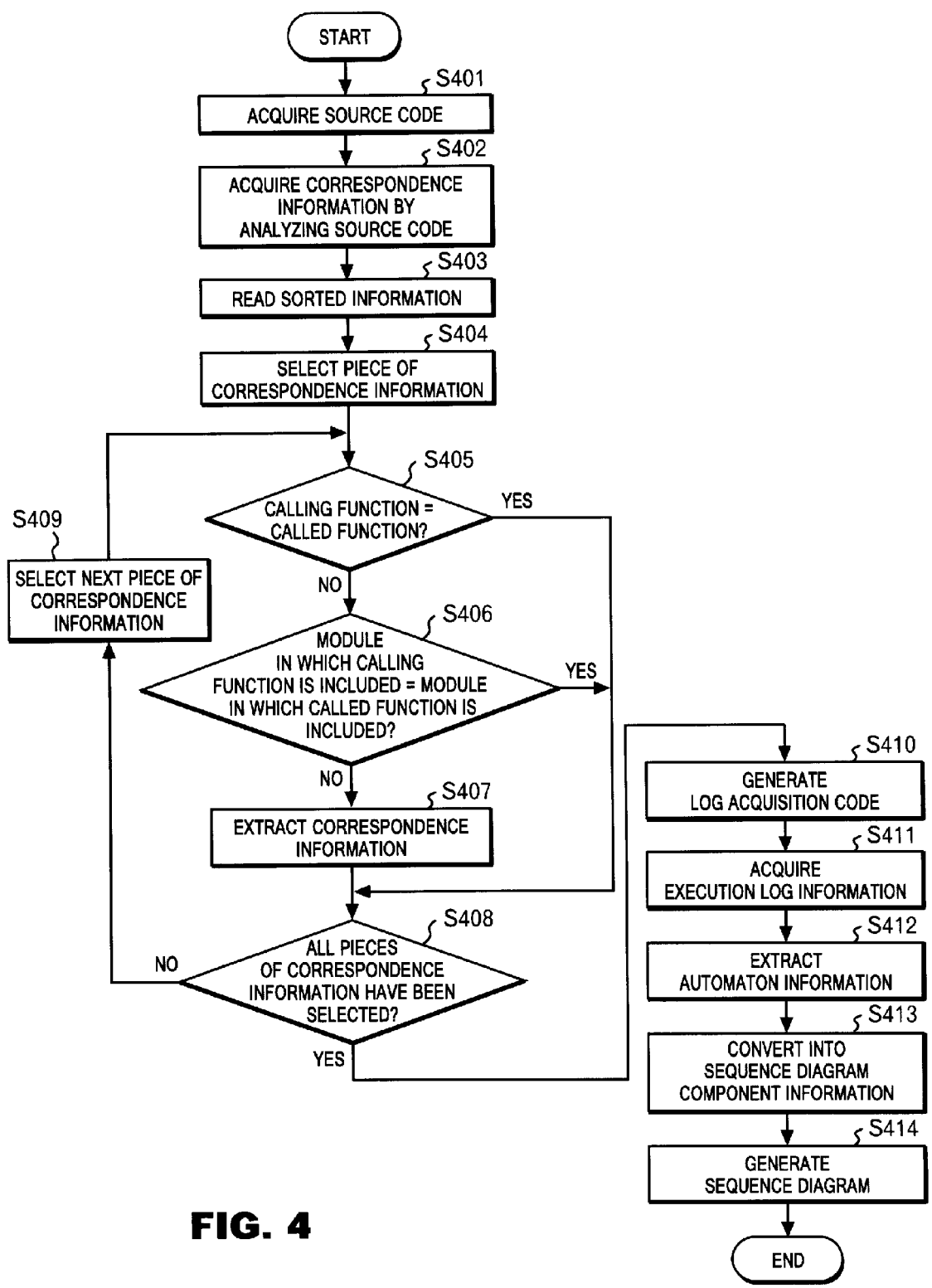
FIG. 4 is a flow chart illustrating a processing flow of a CPU in the sequence diagram generation system of the first embodiment of the present invention.

A description will be given of a processing flow of the sequence diagram generation system 1 having the above configuration. FIG. 4 is a flow chart illustrating a processing flow of the CPU 11 in the sequence diagram generation system 1 of the first embodiment of the present invention.

The CPU 11 of the sequence diagram generation system 1 acquires a source code of a computer program stored in the storage device 13 including a portion which is a target for sequence diagram generation (step S401). To be specific, the CPU 11 reads and loads text data of the source code from the storage device 13 to the memory 12. The CPU 11 then analyzes the obtained source code and acquires correspondence information on respective correspondence relationships between calling functions and called functions included in the source code (step S402). For a description of an illustration of acquiring correspondence information refer to the description of FIGS. 5A and 5B below.

Next, CPU 11 reads sorted information stored in the sorted information storage device 131 of the storage device 13 (step S403) and selects a piece of correspondence information from among the acquired correspondence information (step S404). The CPU 11 then determines whether a calling function is the same function as a called function in the selected correspondence information (step S405).

If it is determined that the calling function is a function different from the called function (step S405: NO), then the CPU 11 determines whether the calling function and the called function are included in the same module (step S406). If it is determined that the calling function is included in a module different from that of the called function (step S406: NO), then the CPU 11 extracts the selected correspondence information (step S407). For a description of an illustration of extracting correspondence information refer to the description of FIGS. 6A to 6C below.

If it is determined that the calling function is the same function as the called function (step S405: YES), then the CPU 11 skips steps S406 and S407. If it is determined that the calling function and the called function are included in the same module (step S406: YES), the CPU 11 skips step S407. Thereafter, the CPU 11 determines whether all of the pieces of correspondence information have been selected (step S408). If it is determined that there is remaining correspondence information yet to be selected (step S408: NO), then the CPU 11 selects the next piece of correspondence information (step S409) and then returns to step S405 to repeat the processing.

If it is determined that all of the pieces of correspondence information have been selected, (step S408: YES), then the CPU 11 of the sequence diagram generation system 1 generates a log acquisition code so that an execution log can be outputted when the called function is called by the calling function included in the extracted piece of correspondence information (step S410). For a description of an illustration of generating a log acquisition code refer to the description of FIGS. 7A to 7C below.

Next, the CPU 11 of the sequence diagram generation system 1 generates an execution module, for example, by compiling the programs including the generated log acquisition codes, and then acquires execution log information (step S411). The execution log information is log information that can be acquired when the execution module is executed. In the first embodiment, an executed call site ID is outputted as a character string indicating the execution log information.

Subsequently, the CPU 11 extracts, based on the acquired execution log information, automaton information related to states and transitions among the states (step S412). For a description of an illustration of an automaton information extraction process refer to the description of FIGS. 8A to 8F below.

Next, the CPU 11 of the sequence diagram generation system 1 converts the extracted automaton information into sequence diagram component information that constitutes a sequence diagram (step S413). For a description of an illustration of a normalization process for converting automaton information into sequence diagram component information refer to the description of FIGS. 9A to 9E below.

Lastly, the CPU 11 of the sequence diagram generation system 1 generates a sequence diagram based on the converted sequence diagram component information (step S414). For a description of an illustration of a sequence diagram generated based on a sequence diagram component information refer to the descriptions of FIGS. 10 and 11 below.

Figure 5:
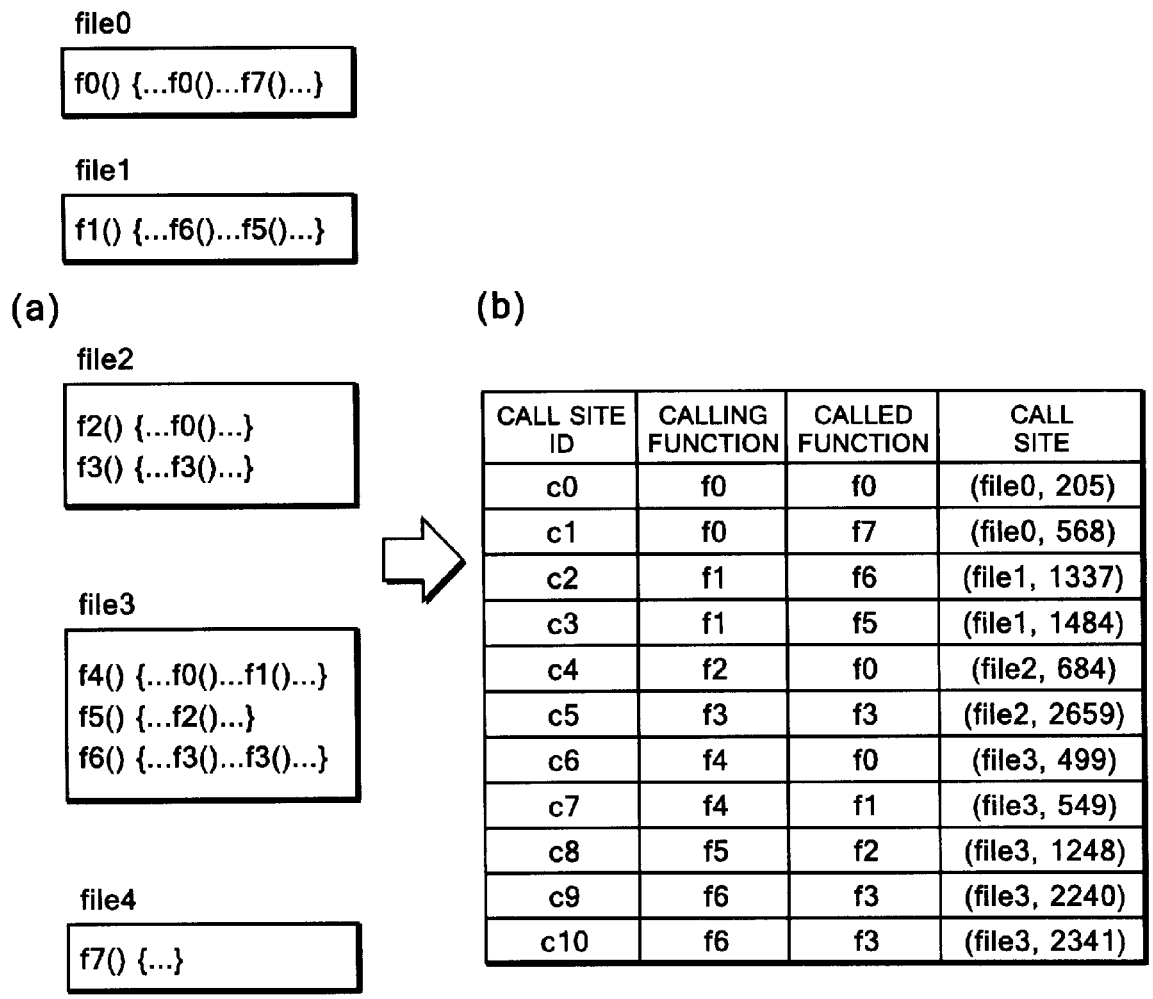
FIGS. 5A and 5B are diagrams illustrating acquisition of correspondence information on the basis of a source code, carried out by the sequence diagram generation system of the first embodiment of the present invention.

FIGS. 5A and B are example diagrams illustrating acquiring correspondence information based on a source code by the sequence diagram generation system 1 of the first embodiment of the present invention. FIG. 5A shows a source code in which control structures, such as, variables, expressions, blocks, repetitions and the like are abbreviated. For instance, 'file0' indicates that called functions f0 and f7 are written so as to correspond to a calling function f0.

FIG. 5B is an example diagram illustrating a data structure of correspondence information. In the example in FIG. 5B, a call site ID being identification information is assigned to each combination of correspondence information between functions. Moreover, a calling function, a called function, and a call site indicating the location of the calling function in the source code are stored for each call site ID. Note that a call site clearly shows the location of a calling function by use of its file name in the source code, and a character number indicating an ordinal position of the character in file. For instance, (file0, 205) indicates that the calling function f0 which is written in 'file0' and starts from the 205-th character in the file.

Figure 6:
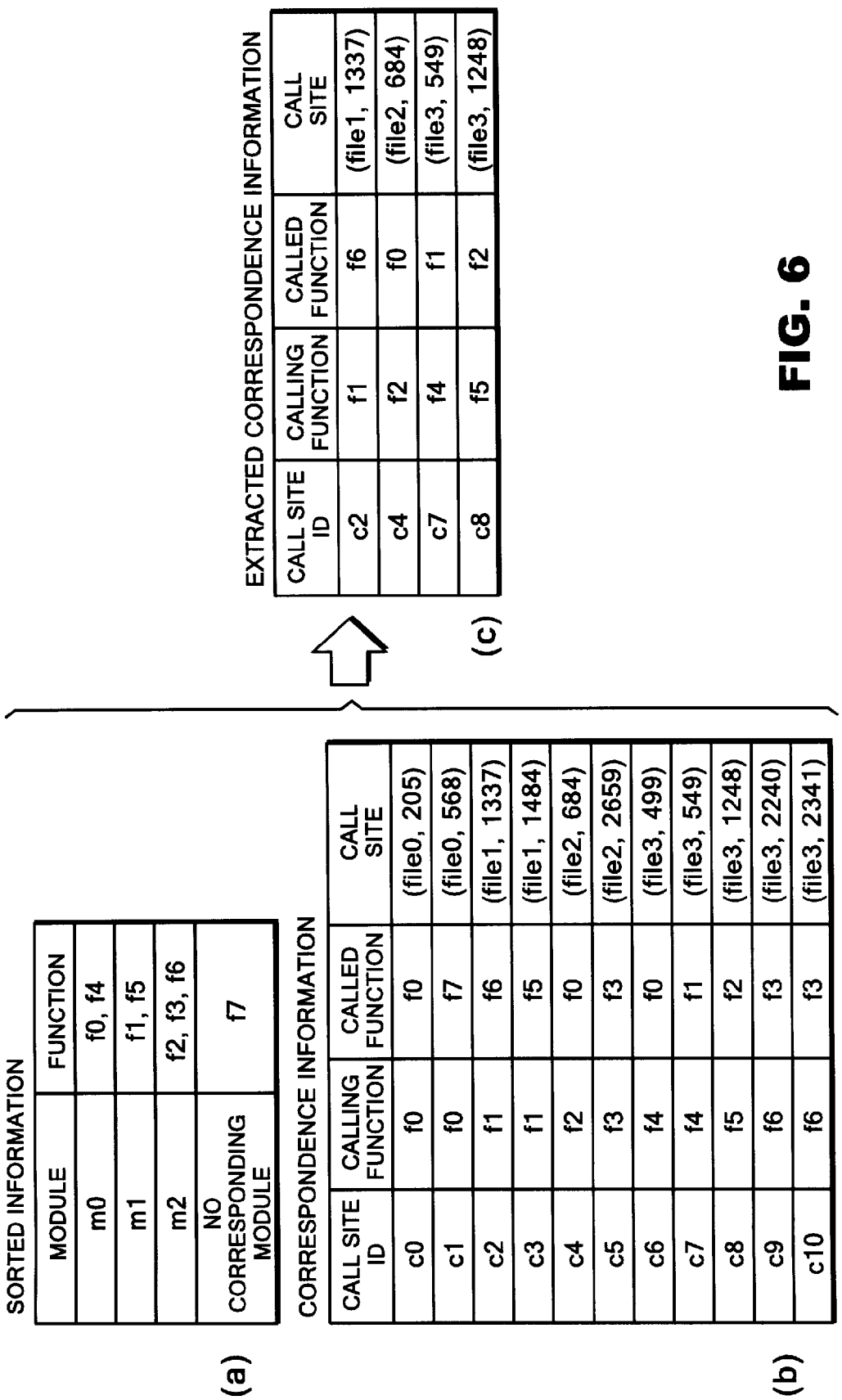
FIGS. 6A to 6C are diagrams illustrating a correspondence information extraction process carried out by the sequence diagram generation system of the first embodiment of the present invention.

FIGS. 6A to 6C are example diagrams illustrating a correspondence information extraction process carried out by the sequence diagram generation system 1 of the first embodiment of the present invention. FIG. 6A is the sorted information illustrated in FIG. 2. FIG. 6B is the correspondence information illustrated in FIG. 5B. As a first step in specific processing, the call site IDs of pieces of correspondence information in which the calling function is the same as the called function are deleted. In the example in FIG. 6B, call site IDs 'c0' and 'c5' are deleted.

Subsequently, with reference to the sorted information, call site IDs of pieces of correspondence information including a calling function and a called function included in the same module are deleted. In the example in FIG. 6B, call site IDs 'c3', 'c6', 'c9' and 'c10' are deleted. Additionally, call site ID 'c1' of the correspondence information including the called function 'f7' is also deleted since the function is not included in any target modules, and is thus unnecessary for generation of the sequence diagram.

Consequently, only correspondence information of the call site IDs 'c2', 'c4', 'c7', and 'c8' are extracted, as shown in FIG. 6C. Thus, a minimum required sequence diagram can be generated by expressing the relationship among these functions for each module.

Figure 7:
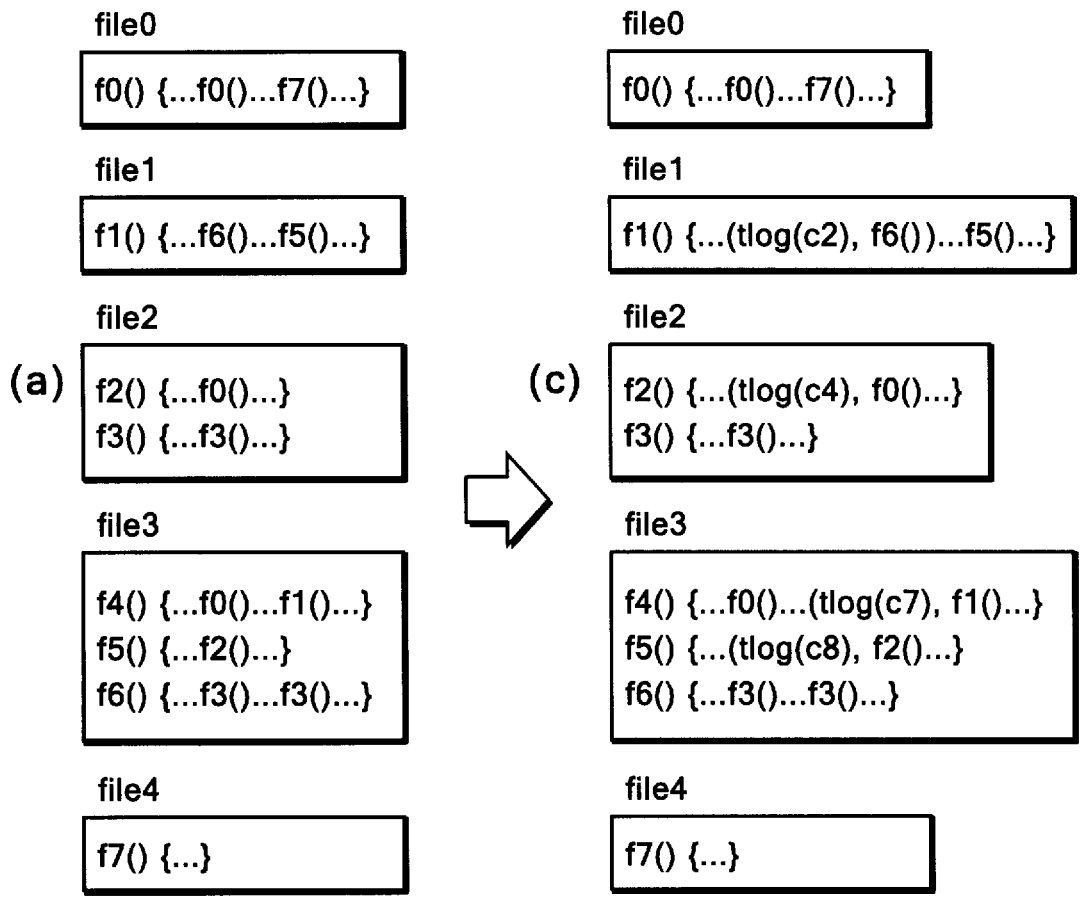
FIGS. 7A to 7C are diagrams illustrating a concrete method of generating a log acquisition code by the sequence diagram generation system of the first embodiment of the present invention.

FIGS. 7A to 7C are example diagrams illustrating a concrete method of generating a log acquisition code for the sequence diagram generation system 1 of the first embodiment of the present invention. FIG. 7A shows the acquired source code in FIG. 5A, and FIG. 7B shows the correspondence information extracted in FIG. 6C. Here, a character string output function tlog( ) is inserted in each position corresponding to the correspondence information in the source code so that an execution log is outputted when a source code including the extracted correspondence information is executed. Note that an argument of the character string output function tlog( ) is a call site ID, and the call site ID is outputted as an execution log.

FIG. 7C is an example diagram illustrating a state in which character string output functions tlog( ) are embedded in the source code. As shown in FIG. 7C, a character string output function tlog( ) is embedded in a portion corresponding to the extracted correspondence information. When this portion of the source code is executed, a call site ID being the argument is outputted as an execution log. To be specific, a calling function fy( ) of a call site cx is converted into (tlog(cx), fy( )), wherein each of x and y is an integer of 0 or a larger.

Figure 8:
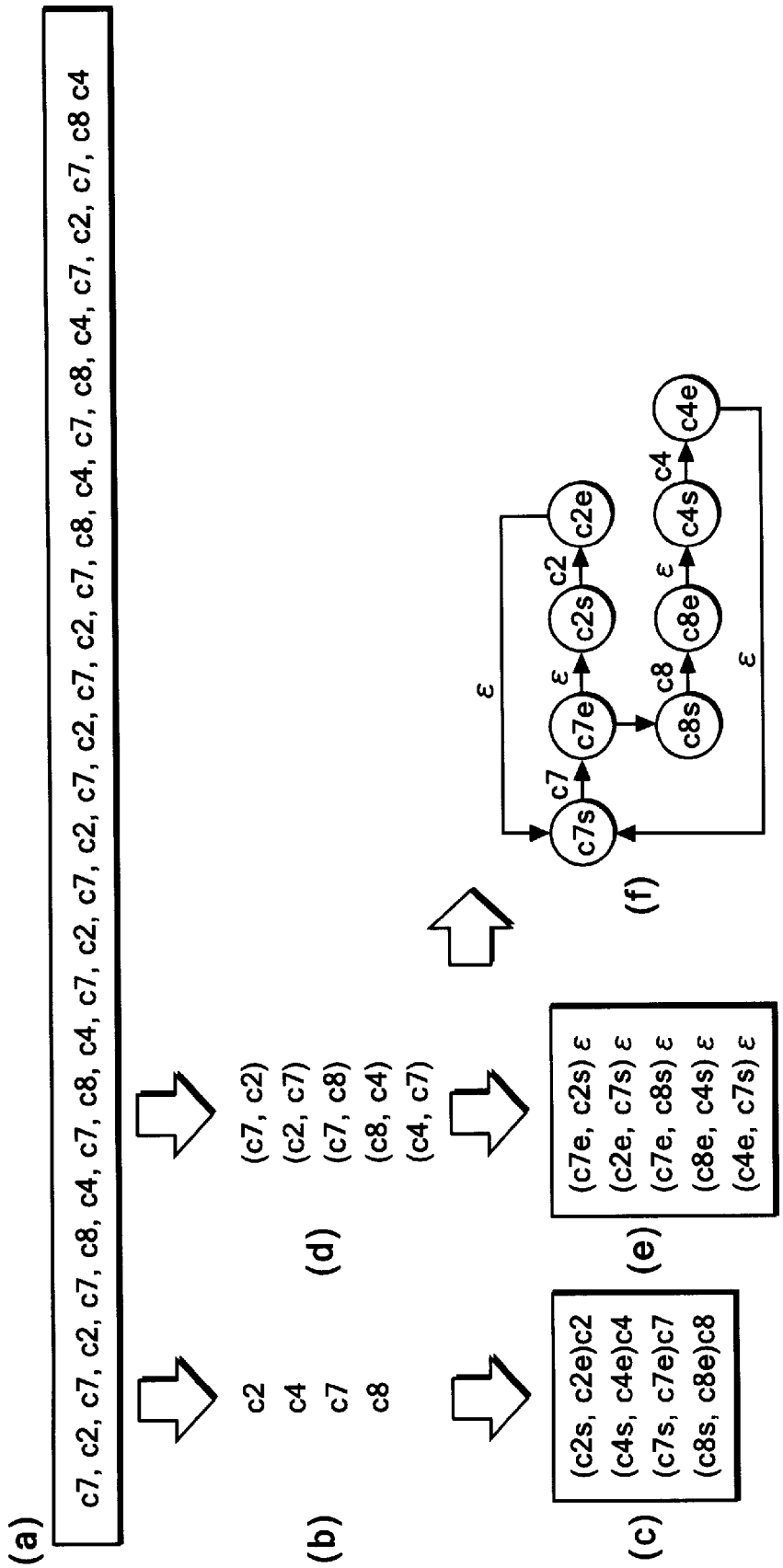
FIGS. 8A to 8F are conceptual diagrams illustrating an automaton information extraction process based on execution log information, carried out by the sequence diagram generation system of the first embodiment of the present invention.

FIG. 8A is an example diagram of execution log information. As shown in FIG. 8A, execution log information can be acquired as a permutation of call site IDs. First, unique elements are extracted from the acquired execution log information as shown in FIG. 8B. Four call site IDs are extracted in the example shown.

Then, a start edge qis and an end edge qie are generated for each extracted element qi, and a label qi is associated to each set. FIG. 8C shows the resultant state after each of the four call site IDs has edges generated and is labeled.

Next, pieces of execution log information of unique combinations of adjacent elements are extracted from the acquired execution log information. As shown in FIG. 8D, the combinations of the execution log information are consolidated to five combinations in the example shown.

Subsequently, an end edge qie and a start edge qis are generated for each combination (qi, qj) and a label ϵ is associated to each combination (qi, qj). FIG. 8E shows the resultant state after each of the five combinations has edges generated and is labeled.

Finally, an automaton as shown in FIG. 8F can be configured by obtaining a union of the set of edges shown in FIG. 8C and the set of edges shown in FIG. 8E. Accordingly, by extracting automaton information configured based on execution log information, unnecessary elements can be excluded in advance when a sequence diagram is generated.

Figure 9:
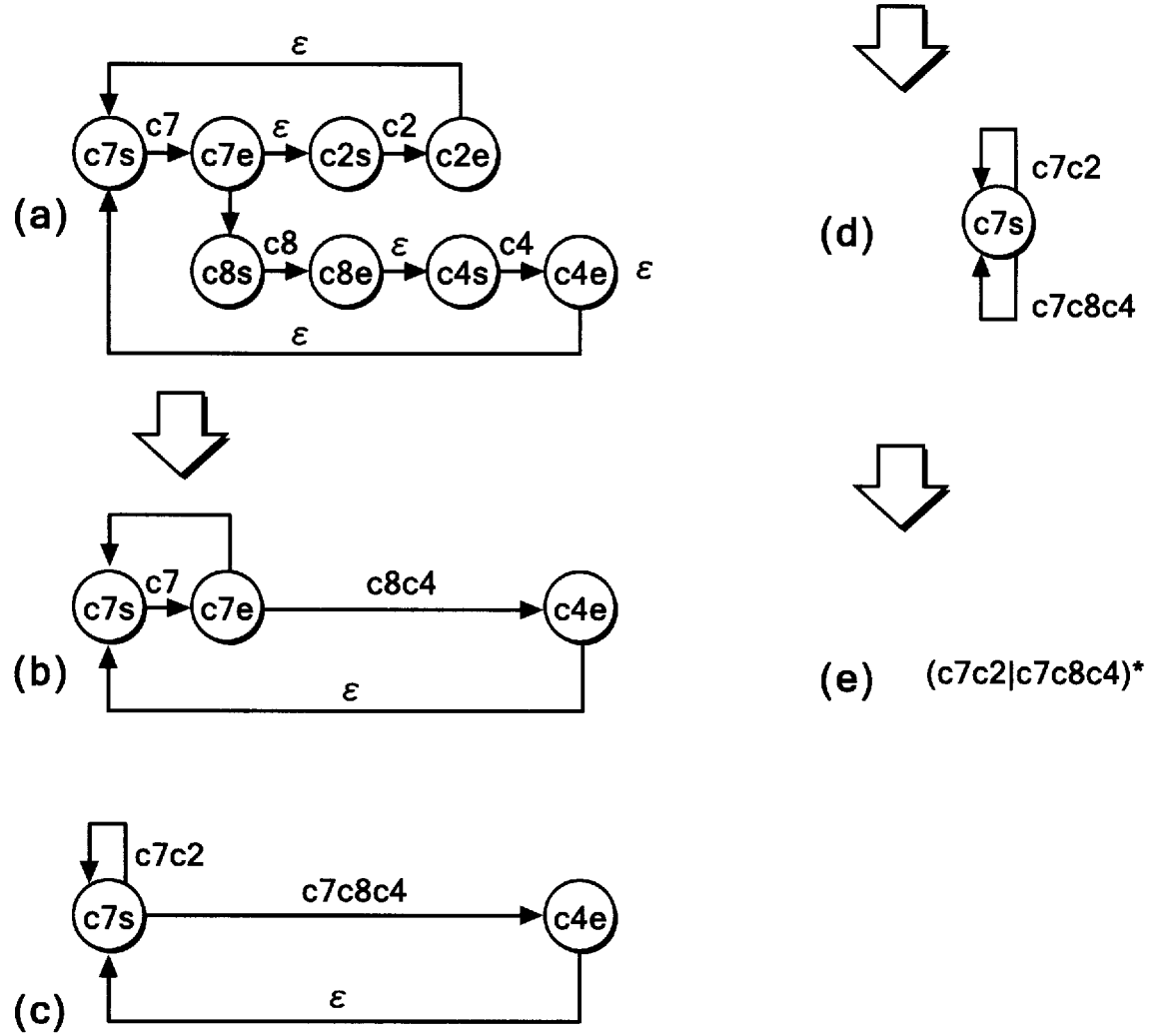
FIGS. 9A to 9E are diagrams of a normalization process for converting automaton information into sequence diagram component information, carried out by the sequence diagram generation system of the first embodiment of the present invention.

The automaton is configured as shown in FIG. 9A. To leave the start state c7s, other states are eliminated. First, states c2s, c2e, c8s, c8e, and c4s are eliminated to simplify the diagram to the state shown in FIG. 9B. Thereafter, intermediate state c7e is eliminated to obtain the simplified diagram shown in FIG. 9C, in which transitions between two states are illustrated.

Then, state c4e is eliminated so that the state can be expressed with one component, and thus the expression can be simplified to the state shown in FIG. 9D. The simplified state shown in 9D can be expressed in a regular expression. Hence, components of the diagram can be specified by expressing the state in a regular expression as in FIG. 9E.

The method for normalizing an automaton is not particularly limited, and in some cases, a simple regular expression may not be obtained by use of the above state-elimination scheme. In this regard, an automaton may be converted into a simple expression by use of the following relational expression 1, for example.

$$r(s|t)=rs|rt$$

$$(s|t)r=sr|tr$$

$$(r^*|s^*)^*=(r^*s^*)^*=(r|s)^* \quad \text{(Expression 1)}$$

For instance, by use of the first expression of expression 1, the regular expression (c7c2|c7c8c4)* shown in FIG. 9E can be converted to (c7(c2|c8c4))*. The converted simple regular expression can be further converted into sequence diagram component information by using the following conversion rule shown in expression 2. Note that 'Module' in expression 2 refers to the process of associating a function to a module name by use of correspondence information.

---

(Expression 2)

Trans(c)=<Module(calling function(c)), called function(c), Module(called function(c))>
    Trans(r*)=loop(Trans(r))
    Trans(r?)=opt(Trans(r))
    Trans(rs)=strict(Trans(r),Trans(s))
    Trans(r|s)=alt(Trans(r),Trans(s))

---

Figures 10, 11:
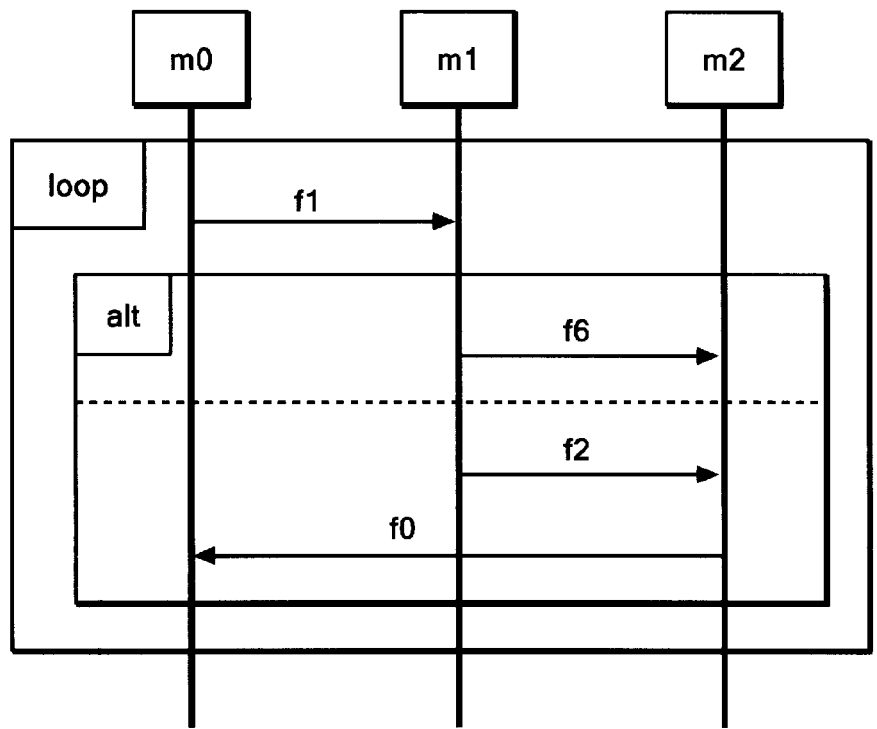
FIG. 10 is an diagram of sequence diagram component information obtained by converting an obtained regular expression in the sequence diagram generation system of the first embodiment of the present invention.
FIG. 11 is an diagram of a sequence diagram generated on the basis of the sequence diagram component information converted by the sequence diagram generation system of the first embodiment of the present invention.

FIG. 10 is an example diagram of sequence diagram component information obtained by converting the obtained regular expression (c7(c2|c8c4))*, in accordance with expression 2, in the sequence diagram generation system 1 of the first embodiment of the present invention. In FIG. 10, 'strict' refers to a definition of the order of executing the modules, 'loop' refers to a loop process, and 'alt' refers to the execution of any one of two types of state transitions. Incidentally, although not shown in the figure, 'opt' refers to a process which is optionally executed depending on the case.

As shown in FIG. 11, generated is a sequence diagram indicating call relationships among the modules m0, m1 and m2 in accordance with the relationships defined by 'strict', 'loop', and 'alt' in the sequence diagram component information shown in FIG. 10. Specifically, the 'loop' at the top indicates that all of the following processes are supposed to be repeated, and the sequence diagram is generated so that either function f6 or functions f2 and f0 are executed after the execution of function f1.

As has been described, the first embodiment is capable of specifying sequence diagram component information based on a source code and thus information acquisition for modeling is unnecessary. In addition, since execution logs are acquired only for the portions that need to be displayed as a sequence diagram, a sequence diagram having a minimum required structure can be easily generated. Accordingly, a clear sequence diagram having a simple structure can be generated even in the case where a source code has a complicated structure. Also, system analysis based on the sequence diagram with the simple structure clarifies problems with a system, for example, locating a bottleneck occurrence location.

A second embodiment is described with reference to the drawings pertaining to the second embodiment.

The configuration and functional blocks of a sequence diagram generation system 1 of a second embodiment of the present invention are the same as those of the first embodiment, and thus detailed descriptions thereof are omitted by assigning the same reference numerals. The second embodiment is different from the first embodiment in that a sequence diagram including an execution occurrence for modules can be generated, by adding the returning of calling functions.

Log acquisition code generation means 303 generates a log acquisition code for acquiring an execution log on the basis of an analysis result of the analysis means 302. To be specific, the log acquisition code generation means 303 reads sorted information stored in the sorted information storage device 131, and extracts only the pieces of correspondence information in which the calling function is different from the called function and the calling function and the called function are sorted into different modules, respectively. Then, the log acquisition code generation means 303 generates a log acquisition code so that an execution log can be outputted when the called function is called by the calling function included in the extracted piece of correspondence information, and also when the processing returns to the calling function. Accordingly, the execution log information acquired by execution log information acquisition means 304 includes the returning of functions, and thus the automaton has a more complicated structure than the first embodiment.

Figure 12:
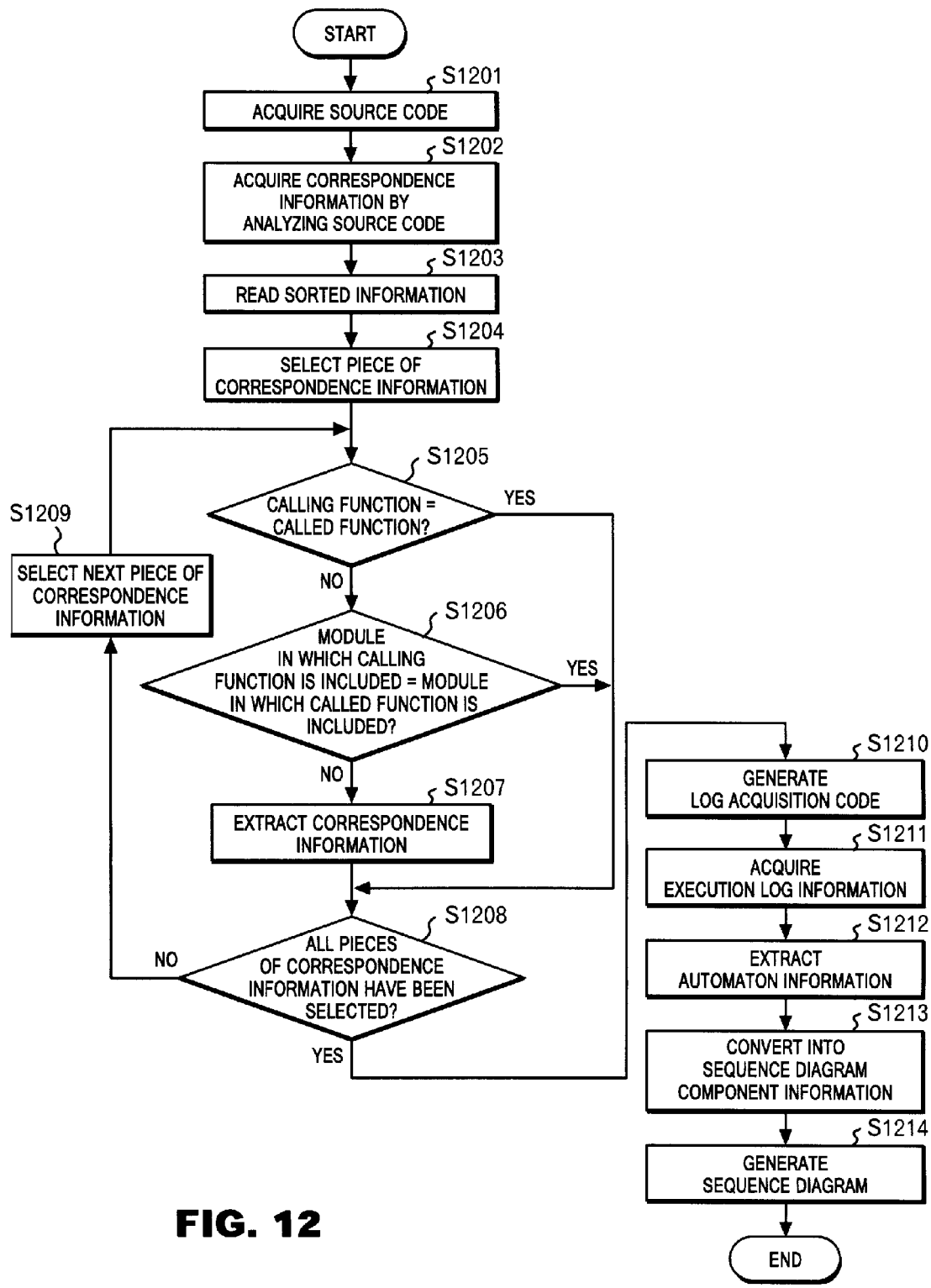
FIG. 12 is a flowchart illustrating a processing procedure of a CPU of a sequence diagram generation system of a second embodiment of the present invention.

FIG. 12 is a flowchart illustrating a processing procedure of a CPU 11 of the sequence diagram generation system 1 of the second embodiment of the present invention. The CPU 11 of the sequence diagram generation system 1 acquires a source code of a computer program stored in the storage device 13 including a portion which is a target of sequence diagram generation (step S1201). To be specific, the CPU 11 reads and loads text data of the source code from the storage device 13 to the memory 12. The CPU 11 then analyzes the obtained source code, and acquires correspondence information on respective correspondence relationships between calling functions and called functions included in the source code (step S1202).

The CPU 11 reads sorted information stored in the sorted information storage device 131 of the storage device 13 (step S1203), and selects a piece of correspondence information from among the acquired correspondence information (step S1204). The CPU 11 then determines whether a calling function is the same function as a called function in the selected correspondence information (step S1205).

If it is determined that the calling function is a function different from the called function (step S1205: NO), then the CPU 11 determines whether the calling function and the called function are included in the same module (step S1206). If it is determined that the calling function is included in a module different from that of the called function (step S1206: NO), then the CPU 11 extracts the selected correspondence information (step S1207).

If it is determined that the calling function is the same function as the called function (step S1205: YES), then the CPU 11 skips steps S1206 and S1207. If it is determined that the calling function and the called function are included in the same module (step S1206: YES), then the CPU 11 skips step S1207, and thereafter determines whether all of the pieces of correspondence information have been selected (step S1208). If it is determined that there is remaining correspondence information yet to be selected (step S1208: NO), then the CPU 11 selects the next piece of correspondence information (step S1209) and then returns to step S1205 to repeat the processing.

If it is determined that all of the pieces of correspondence information have been selected (step S1208: YES), then the CPU 11 generates a log acquisition code so that an execution log can be outputted when the called function is called by the calling function included in the extracted piece of correspondence information, and when the processing returns to the calling function (step S1210). For a description of an illustration of a concrete method of generating a log acquisition code for the sequence diagram generation system 1 of the second embodiment of the present invention refer to the description of FIGS. 13A to 13C below.

Next, the CPU 11 of the sequence diagram generation system 1 generates an execution module, for example, by compiling the programs including the generated log acquisition codes, and then acquires execution log information (step S1211). The execution log information is log information that can be acquired when the execution module is executed. In the second embodiment, an executed call site ID and a return ID indicating the returning of the calling function are outputted as character strings indicating the execution log information. That is, tlog(cx) outputs cx, and rlog(cx) outputs rx.

The CPU 11 extracts, based on the acquired execution log information, automaton information related to states and transitions among the states (step S1212). For a description of an illustration of an automaton information extraction process based on execution log information of the sequence diagram generation system 1 of the second embodiment of the present invention refer to the description of FIGS. 14A to 14E and 15A and 15B below.

Subsequently, the CPU 11 of the sequence diagram generation system 1 converts the extracted automaton information into sequence diagram component information that constitutes a sequence diagram (step S1213).

A description of a normalization process shown in FIGS. 16A to 16E for converting automaton information of the sequence diagram generation system 1 of the second embodiment into sequence diagram component information is set forth below.

Lastly, the CPU 11 of the sequence diagram generation system 1 generates a sequence diagram based on the converted sequence diagram component information (step S1214). For a description of an illustration of a sequence diagram generated on the basis of the sequence diagram component information converted by the sequence diagram generation system 1 of the second embodiment of the present invention refer to the descriptions of FIGS. 17 and 18 below.

Figure 13:
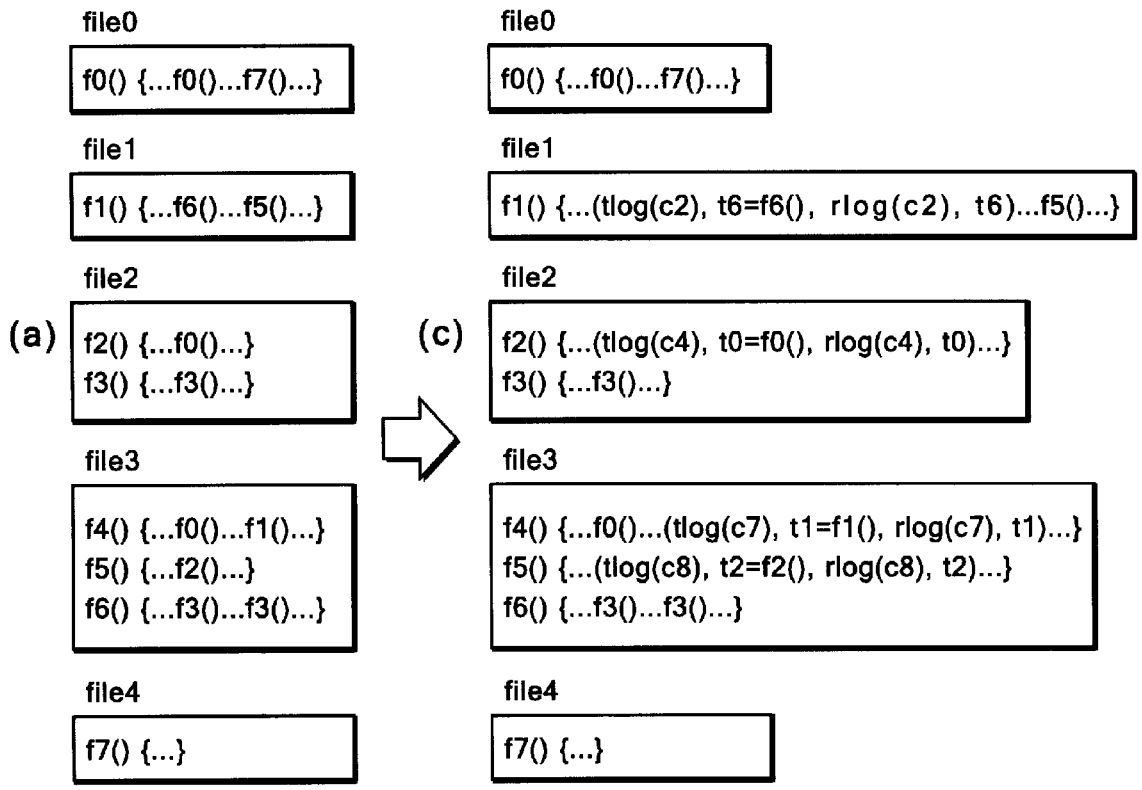
FIGS. 13A to 13C are diagrams illustrating a concrete method of generating a log acquisition code by the sequence diagram generation system of the second embodiment of the present invention.

FIGS. 13A to 13C are example diagrams illustrating a concrete method of generating a log acquisition code for the sequence diagram generation system 1 of the second embodiment of the present invention. FIG. 13A shows the acquired source code, and FIG. 13B shows the extracted correspondence information. The source code and the correspondence information are the same as the first embodiment, while character string output functions to be inserted to the source code are added.

In other words, as shown in FIG. 13C, a character string output function tlog( ) is inserted to a position corresponding to the correspondence information in the source code to output an execution log when a source code including the extracted correspondence information is executed. At the same time, a character string output function rlog( ) is also inserted to a position corresponding to the correspondence information in the source code to output an execution log when the processing returns to the calling function. To be specific, a calling function fy( ) of a call site cx is converted into (tlog(cx), ty=fy( ), rlog(cx), ty), wherein each of x and y is an integer of 0 or a larger and ty is a variable of the same type as the calling function fy.

Figure 14:
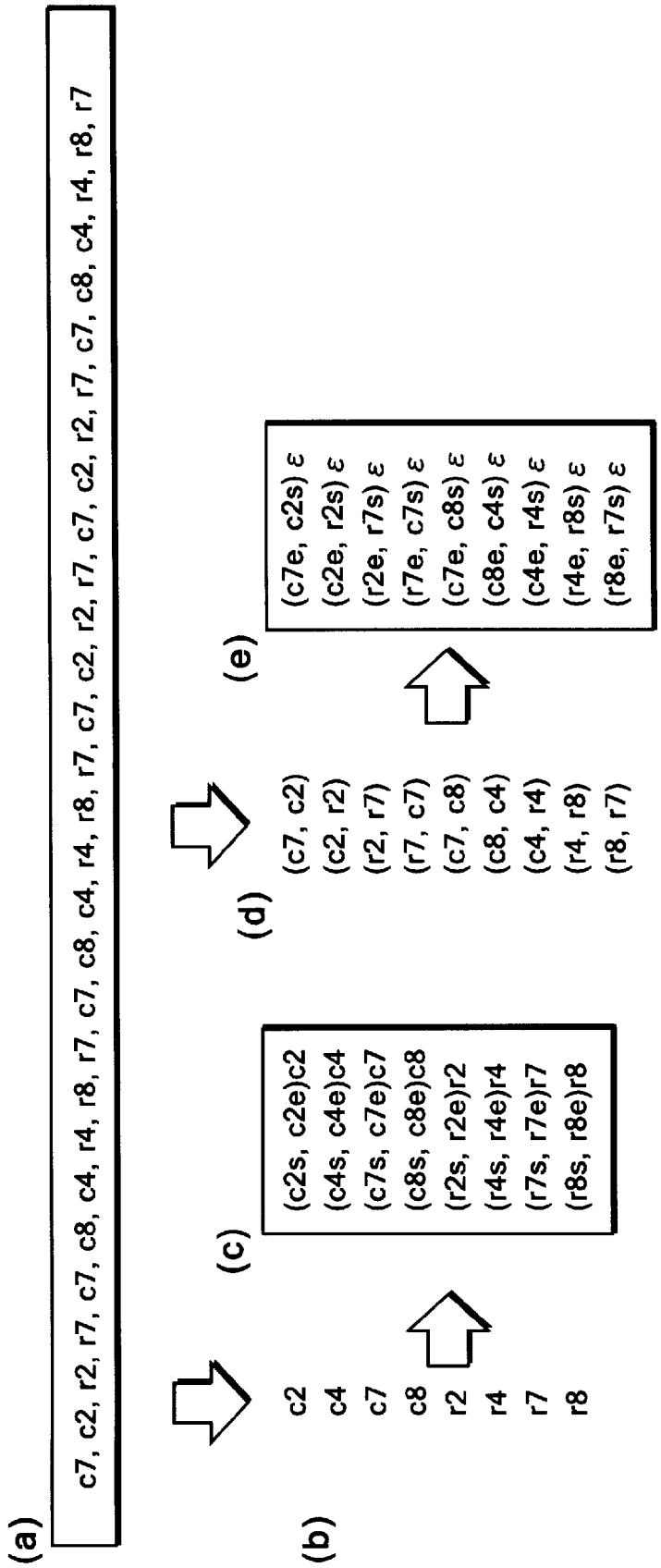
FIGS. 14A to 14E are conceptual diagrams illustrating an automaton information extraction process based on execution log information, carried out by the sequence diagram generation system of the second embodiment of the present invention.

FIG. 14A is an example diagram of execution log information. As shown in FIG. 14A, execution log information can be acquired as a permutation of call site IDs and return IDs. First, unique elements are extracted from the acquired execution log information as shown in FIG. 14B. Four call site IDs and four return IDs are extracted in the example shown.

Then, a start edge qis and an end edge qie are generated for each extracted element qi, and a label qi is associated to each set. FIG. 14C shows the resultant state after each of the four call site IDs and the four return IDs has edges generated and is labeled.

Next, pieces of execution log information of unique combinations of adjacent elements are extracted from the acquired execution log information. As shown in FIG. 14D, the combinations of the execution log information are consolidated to nine combinations in the second embodiment.

Subsequently, an end edge qie and a start edge qis are generated for each combination (qi, qj) and a label ε is associated to each combination (qi, qi). FIG. 14E shows the resultant state after each of the nine combinations has edges generated and is labeled.

Figure 15:
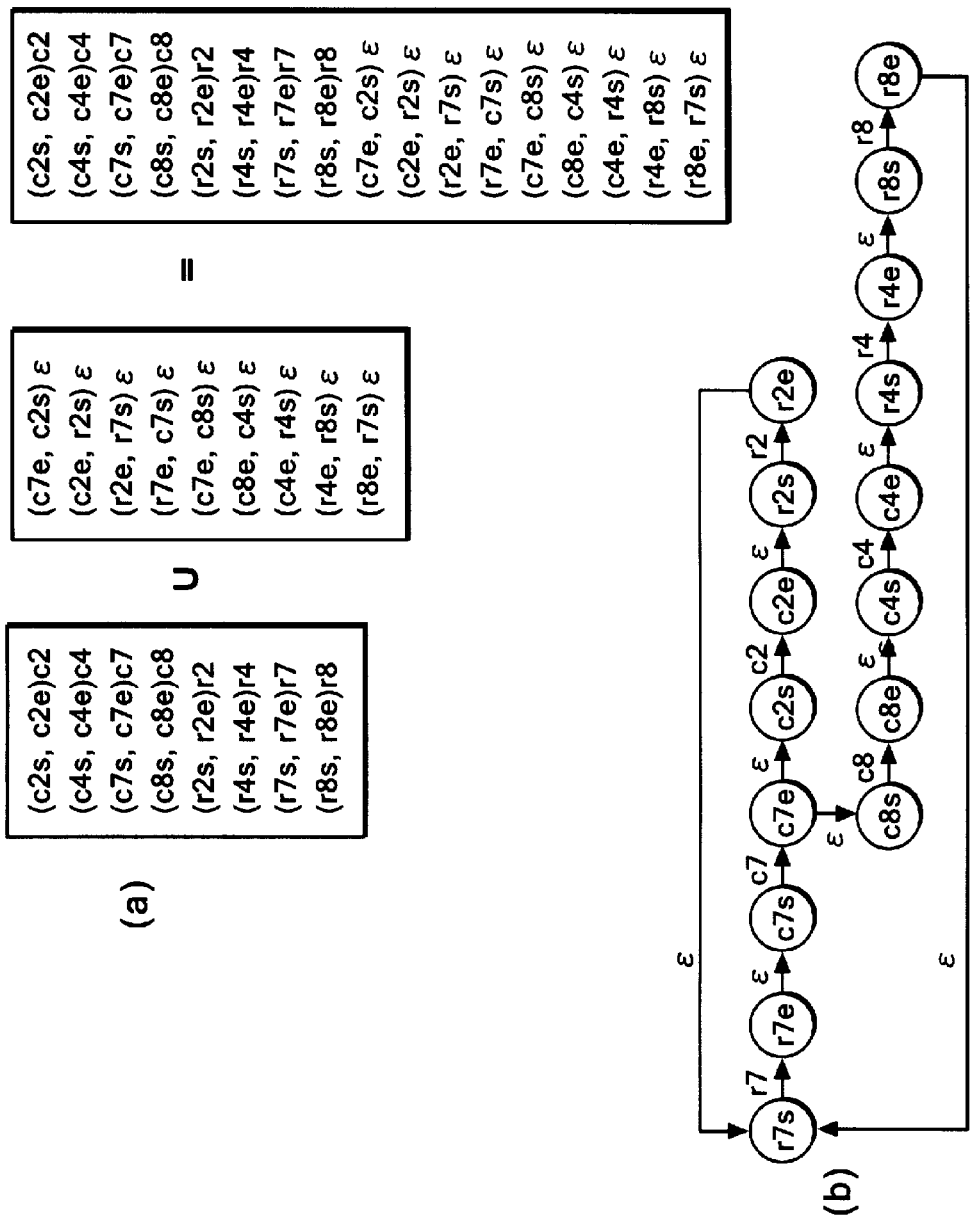
FIGS. 15A and 15B are conceptual diagrams illustrating an automaton information extraction process based on execution log information, carried out by the sequence diagram generation system of the second embodiment of the present invention.

Finally, a union of the set of edges shown in FIG. 14C and the set of edges shown in FIG. 14E is obtained as shown in FIG. 15A. Thus, an automaton shown in FIG. 15B can be configured based on the basis of the obtained union. Accordingly, by thus extracting automaton information configured on the basis of execution log information, unnecessary elements can be excluded in advance when a sequence diagram is generated.

The automaton is configured as shown in FIG. 16A. To leave the start state c7s, other states are eliminated. Firstly, states r7e, c2s, c2e, r2s, r2e, c8s, c8e, c4s, c4e, r4s, r4e, r8s, and r8e are eliminated to simplify the diagram to the state shown in FIG. 16B. Thereafter, intermediate state c7e is eliminated to obtain the simplified diagram shown in FIG. 16C, in which transitions between two states are illustrated.

Then, state r7s is eliminated so that the state can be expressed with one component, and thus the expression can be simplified to the state shown in FIG. 16D. The simplified state shown in 16D can be expressed in a regular expression. Hence, components of the diagram can be specified by expressing the state in a regular expression as in FIG. 16E.

The method for normalizing an automaton is not particularly limited, and in some cases, a simple regular expression may not be obtained by use of the above state-elimination scheme. In this regard, an automaton may be converted into a simple expression by use of the relational expression 1, for example, as in the first embodiment.

For instance, by use of the first expression of expression 1, the regular expression (c7c2r2r7|c7c8c4r4r8r7)* shown in FIG. 16E can be converted to be expressed as (c7 (c2r2r7|c8c4r4r8r7))*, and by use of the second expression, converted to be expressed as (c7(c2r2|c8c4r4r8)r7)*. The converted simple regular expression is further converted into sequence diagram component information as in the first embodiment, by using the following conversion rule shown in expression 3. Note that 'Module' in expression 3 refers to the process of associating a function to a module name by use of correspondence information.

(Expression 3)

Trans(c)=<Module(calling function(c)), called function(c), Module(called function(c))>
Trans(r)=<Module(calling function(c)), called function (c):return, Module(called function(c))>
Trans(r*)=loop(Trans(r))
Trans(r?)=opt(Trans(r))
Trans(rs)=strict(Trans(r),Trans(s))
Trans(r|s)=alt(Trans(r),Trans(s))

Figures 16, 17:
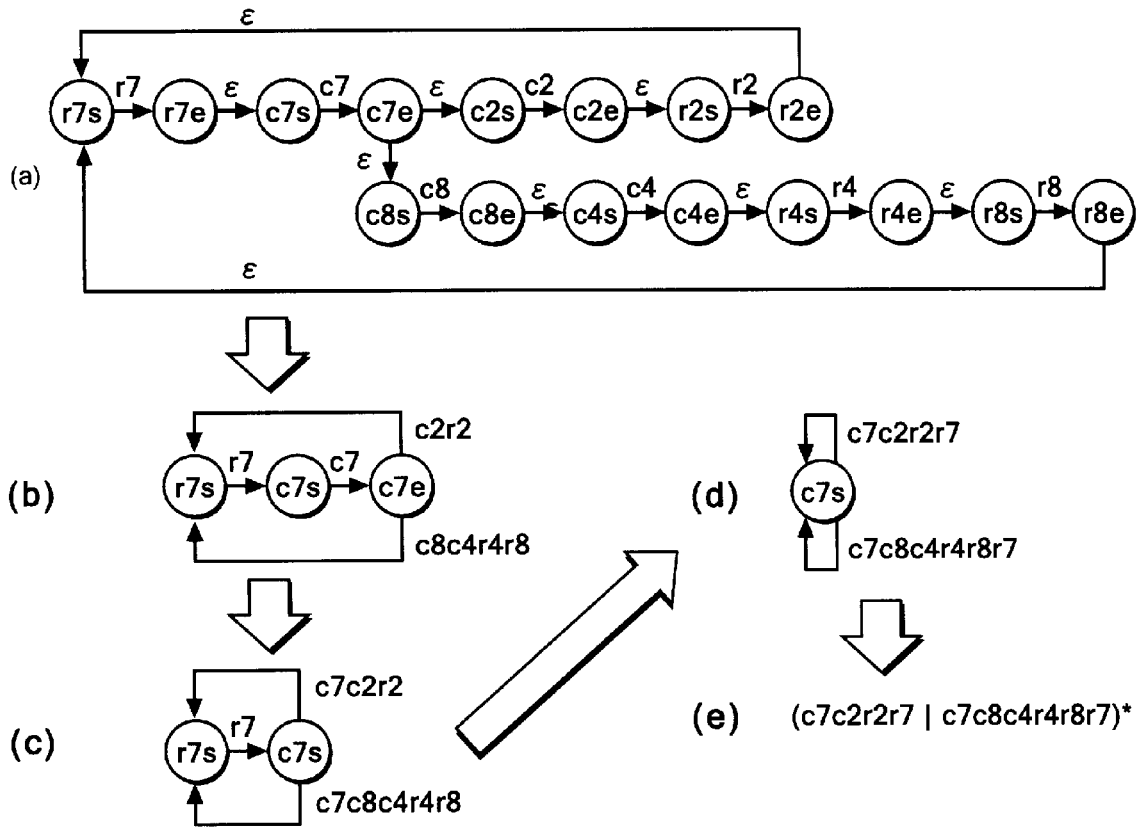
FIG. 17 is an diagram of sequence diagram component information obtained by converting an obtained regular expression in the sequence diagram generation system of the second embodiment of the present invention.

FIG. 17 is an exemplar diagram of sequence diagram component information obtained by converting the obtained regular expression (c7(c2r2|c8c4r4r8)r7)* in accordance with expression 3, in the sequence diagram generation system 1 of the second embodiment of the present invention. In FIG. 17, 'strict' refers to a definition of a calling function transitioning between modules, 'loop' refers to a loop process, and 'alt' refers to the execution of any one of two types of state transitions.

Figure 18:
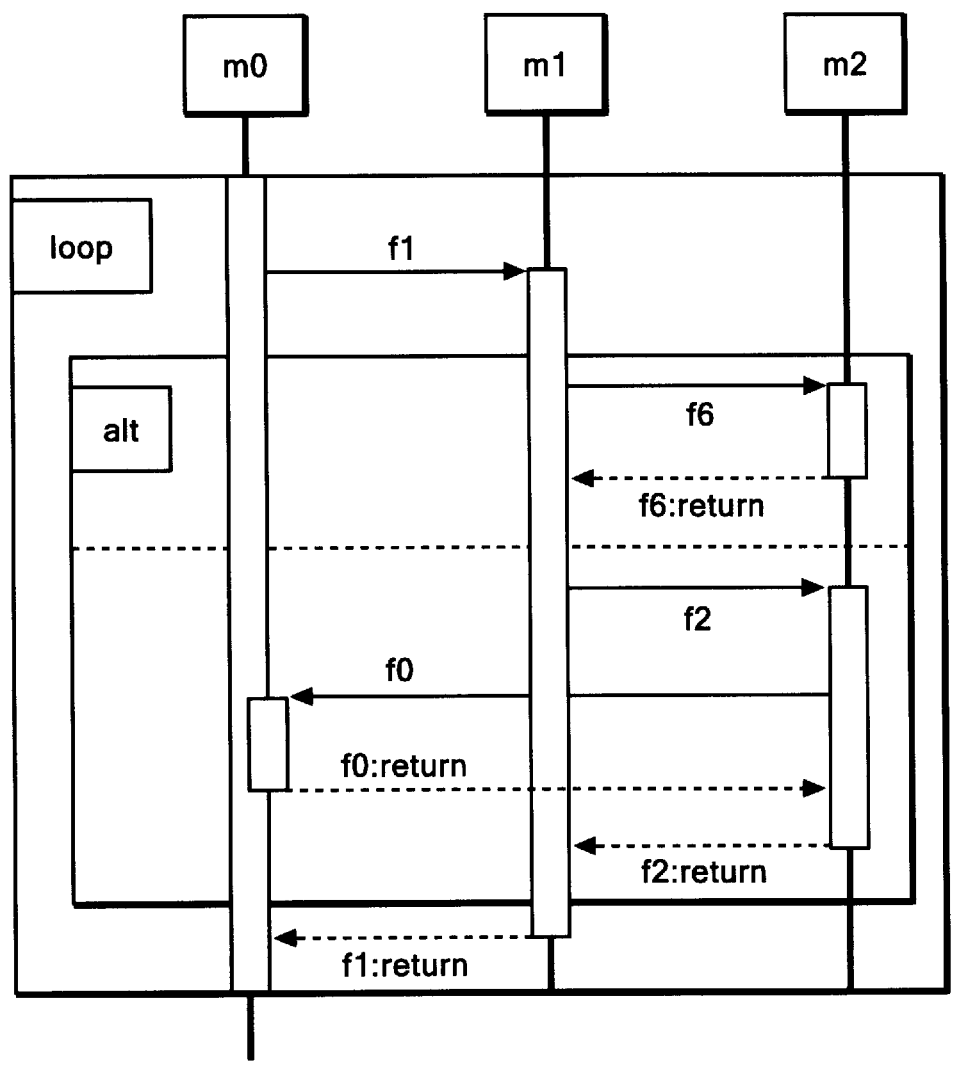
FIG. 18 is an diagram of a sequence diagram generated on the basis of the sequence diagram component information converted by the sequence diagram generation system of the second embodiment of the present invention.

As shown in FIG. 18, a sequence diagram is generated indicating call relationships among the modules m0, m1 and m2 in accordance with the relationships defined by 'strict', 'loop', and 'alt' in the sequence diagram component information shown in FIG. 17. Specifically, the 'loop' at the top indicates that all of the following processes are supposed to be repeated, and the sequence diagram is generated so that either function f6 or functions f2 and f0 are executed after the execution of function f1.

Moreover, unlike the first embodiment, a return timing can be specified for each function, so that an execution occurrence of a module (rectangular portion in FIG. 18) can be expressed for each module in the sequence diagram. Thus, a visual check on call and return timings of each of the functions can be easily made by looking at the sequence diagram.

As has been described, the second embodiment is capable of specifying a correspondence relationship between a calling function and a called function for each module, as well as specifying a return execution timing of the calling function. This contributes to ensured acquisition of process transition logs among modules, and of timings at which certain functions are executed. Accordingly, execution logs can be acquired only for the portions that need to be displayed as a sequence diagram so that a sequence diagram including execution timings of modules can be easily generated without considering the modeling process.

Note that in the first and second embodiments it may be preferable, in the case of some processes, to generate a sequence diagram by expressing multiple modules as a single module, and expressing the process within the module as recursive calls. For instance, when module m0 and m1 are collectively displayed as module m3 in the first embodiment, the data structure stored in the sorted information storage device 131 changes accordingly.

Figures 19, 20:
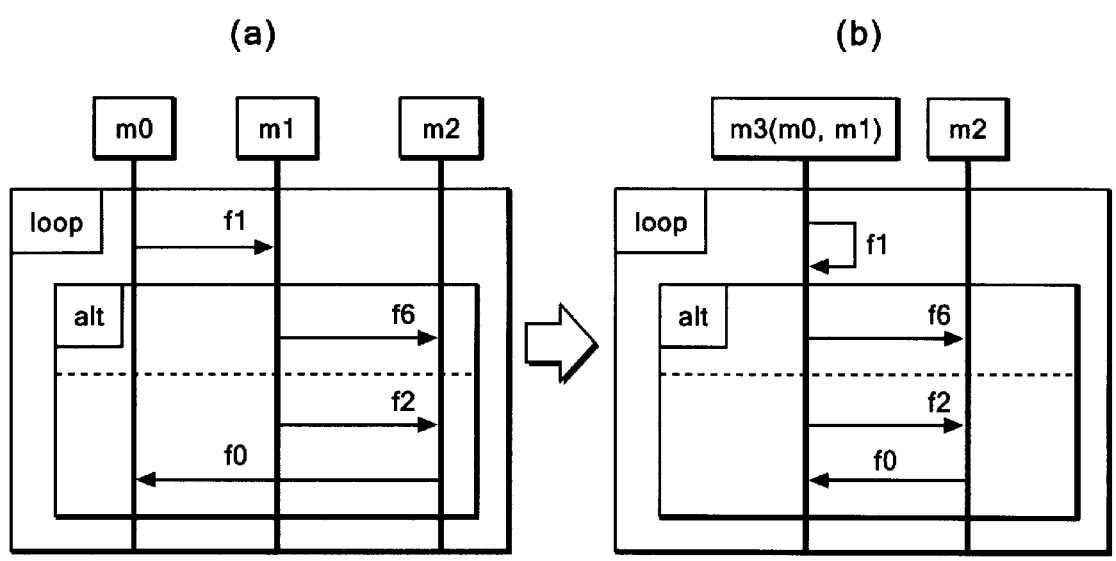
FIG. 19 is an diagram of a data structure of the sorted information storage device in the case where multiple modules are integrated.

FIG. 19 is an example diagram of a data structure of the sorted information storage device 131 in the case where multiple modules are integrated. As shown in FIG. 19, module m3, in which modules m0 and m1 are integrated, is set in a higher layer than the two modules m0 and m1. When a sequence diagram is generated based on m3 in a manner similar to the first embodiment, calling function f1 is excluded from the sequence diagram generation targets.

However, if the sequence diagram shown in FIG. 11 is already generated by the processing of the first embodiment, calling function f1 can be left in the diagram as a recursive calling function.

FIGS. 20A and 20B are example diagrams of a sequence diagram in which multiple modules are integrated.

As can be seen from FIG. 20A, it is obvious that calling function f1 will become a recursive calling function if module m3, in which modules m0 and m1 are integrated, is employed. Naturally, calling function f1 can be left in the sequence diagram as the recursive calling function. As shown in FIG. 20B, since modules m0 and m1 are integrated, the distinction inside 'alt' is no longer necessary, and thus the broken line explicitly indicating the selected range is eliminated. Hence, a simpler sequence diagram can be generated. In particular, in the case of a large-scale source code, fewer modules can be displayed in a sequence diagram, and the simplified structure of the diagram helps improve the viewability of the diagram.

According to the present invention, since an analysis is made on the basis of a source code, modeling does not need to be considered. Thus, a sequence diagram of a minimum required structure can be generated easily by acquiring execution logs on the basis of the execution log information only for portions that need to be displayed as a sequence diagram. For this reason, a sequence diagram of a simple structure can be generated even in the case of a large-scale complicated source code. Problems in a system such as specification of a bottleneck occurrence location can be identified by system analysis based on the sequence diagram with the simple structure.

The description above of a sequence diagram generation system or a method thereof describes a computer program installed in a computer system. However, as is obvious to those skilled in the art, a part of the present invention can be implemented as a computer program that can be executed on a computer. Accordingly, the present invention is feasible as an embodiment in hardware as a sequence diagram generation system, an embodiment as software, or an embodiment as a combination of software and hardware. The computer program may be recorded in any computer-readable recording medium, such as a hard disk, a DVD, a CD, an optical storage device, and a magnetic storage device.

Note that the present invention is not limited to the above embodiments, and various modifications and improvements are possible within the scope of the present invention. For example, the sequence diagram generation system 1 may be configured with a single computer. Otherwise, the sequence diagram generation system 1 may be configured in a network computing environment in which multiple computers connected through the network to enable data communications. These modifications, improvements and the like are obvious to those skilled in the art, and embodiments to which the modifications, improvements and the like are applied are included in the technical scope of the present invention.

What is claimed is:

1. A sequence diagram generation computer system for analyzing a source code and generating a sequence diagram that specifies processing among modules included in the source code, the sequence diagram generation computer system comprising:
    code acquisition means for acquiring the source code;
    analysis means for analyzing the acquired source code to produce an analysis result;
    log acquisition code generation means for generating, on the basis of the analysis result, a log acquisition code, wherein the log acquisition code generation means is configured (i) to acquire sorted information in which the calling functions and the called functions are sorted on a module basis, (ii) to extract, from the acquired correspondence information, only the correspondence information including a calling function and a called function different from each other and including the different calling and called functions sorted into different modules, respectively, and (iii) to generate a log acquisition code so that an execution log can be outputted when the called function is called by the calling function included in the extracted piece of correspondence information;
    execution log information acquisition means for acquiring, by executing a program including the generated log acquisition code, execution log information that is log information of the execution of the program;
    automaton information extraction means for extracting, on the basis of the acquired execution log information, automaton information related to states and transitions among the states;
    conversion means for converting the extracted automaton information into sequence diagram component information on components constituting a sequence diagram; and
    generation means for generating, on the basis of the converted sequence diagram component information, a sequence diagram.

2. The sequence diagram generation computer system according to claim 1, wherein:
    the analysis means is configured to acquire, on the basis of the source code, correspondence information on respective correspondence relationships between calling functions and called functions.

3. The sequence diagram generation computer system according to claim 2, wherein the log acquisition code generation means is configured (i) to acquire sorted information in which the calling functions and the called functions are sorted on a module basis, (ii) to extract, from the acquired correspondence information, only the correspondence information including a calling function and a called function different from each other and including the different calling and called functions sorted into different modules, respectively, and (iii) to generate a log acquisition code so that an execution log can be outputted both (a) when the called function is called by the calling function included in the extracted piece of correspondence information and (b) also when processing returns to the calling function.

4. A sequence diagram generation method executable by a sequence diagram generation computer system for analyzing a source code and generating a sequence diagram that specifies processing among modules included in the source code, the method comprising the steps of:
    acquiring, by the computer system, the source code to be analyzed;
    analyzing, by the computer system, the acquired source code to produce an analysis result;
    generating, by the computer system, a log acquisition code for acquiring an execution log on the basis of the analysis result, wherein the step of generating the log acquisition code is carried out by:
        (i) acquiring, by the computer system, sorted information in which the calling functions and the called functions are sorted on a module basis;
        (ii) extracting, by the computer system and from the acquired correspondence information, only the correspondence information including a calling function and a called function different from each other and including the different calling and called functions sorted into different modules, respectively; and
        (iii) generating, by the computer system, the log acquisition code for outputting an execution log when the called function is called by the calling function included in the extracted correspondence information;
    acquiring, by the computer system, an execution log information of a program execution by executing the program which includes the generated log acquisition code;
    extracting, by the computer system, an automaton information related to states and transitions among the states on the basis of the acquired execution log information;

converting, by the computer system, the extracted automaton information into a sequence diagram component information on components constituting a sequence diagram; and generating, by the computer system, a sequence diagram on the basis of the converted sequence diagram component information.

5. The sequence diagram generation method according to claim 4, wherein the step of analyzing the acquired source code is carried out by acquiring, by the computer system, correspondence information on respective correspondence relationships between calling functions and called functions on the basis of the source code.

6. The sequence diagram generation method according to claim 5, wherein the step of analyzing the acquired source code is carried out by acquiring, by the computer system, correspondence information on respective correspondence relationships between calling functions and called functions on the basis of the source code; and wherein the step of generating the log acquisition code is carried out by:
(i) acquiring, by the computer system, sorted information in which the calling functions and the called functions are sorted on a module basis;
(ii) extracting, by the computer system and from the acquired correspondence information, only the correspondence information including a calling function and a called function different from each other and including the different calling and called functions sorted into different modules, respectively; and
(iii) generating, by the computer system, the log acquisition for outputting an execution log both (a) when the called function is called by the calling function included in the extracted correspondence information and (b) also when processing returns to the calling function.

7. A computer program product including a processor executable by a sequence diagram generation computer system for analyzing a source code and generating a sequence diagram that specifies processing among modules included in the source code, the computer program product causing the sequence diagram generation computer system to execute the steps of:

acquiring, by the computer system, the source code to be analyzed;

analyzing, by the computer system, the acquired source code to produce an analysis result;

generating, by the computer system, a log acquisition code for acquiring an execution log on the basis of the analysis result, wherein the step of analyzing the acquired source code is carried out by acquiring, by the computer system, correspondence information on respective correspondence relationships between calling functions and called functions on the basis of the source code; and wherein the step of generating the log acquisition code is carried out by:
(i) acquiring, by the computer system, sorted information in which the calling functions and the called functions are sorted on a module basis;
(ii) extracting, by the computer system and from the acquired correspondence information, only the correspondence information including a calling function and a called function different from each other and including the different calling and called functions sorted into different modules, respectively; and
(iii) generating, by the computer system, the log acquisition code for outputting an execution log when the called function is called by the calling function included in the extracted correspondence information;

acquiring, by the computer system, an execution log information of a program execution by executing the program which includes the generated log acquisition code;

extracting, by the computer system, an automaton information related to states and transitions among the states on the basis of the acquired execution log information;

converting, by the computer system, the extracted automaton information into a sequence diagram component information on components constituting a sequence diagram; and generating, by the computer system, a sequence diagram on the basis of the converted sequence diagram component information.

8. The computer program product according to claim 7, wherein the step of analyzing the acquired source code is carried out by acquiring, by the computer system, correspondence information on respective correspondence relationships between calling functions and called functions on the basis of the source code.

9. The computer program product according to claim 7, wherein the step of analyzing the acquired source code is carried out by acquiring, by the computer system, correspondence information on respective correspondence relationships between calling functions and called functions on the basis of the source code; and wherein the step of generating the log acquisition code is carried out by:
(i) acquiring, by the computer system, sorted information in which the calling functions and the called functions are sorted on a module basis;
(ii) extracting, by the computer system and from the acquired correspondence information, only the correspondence information including a calling function and a called function different from each other and including the different calling and called functions sorted into different modules, respectively; and
(iii) generating, by the computer system, the log acquisition for outputting an execution log both (a) when the called function is called by the calling function included in the extracted correspondence information and (b) also when processing returns to the calling function.

\* \* \* \* \*